United States Patent [19]
Johnston et al.

[11] Patent Number: 5,190,112
[45] Date of Patent: Mar. 2, 1993

[54] ROTARY HOE EXTENSION

[75] Inventors: Mark Johnston, McComb; Patrick T. Whalen, Colchester, both of Ill.

[73] Assignee: Yetter Manufacturing Company, Colchester, Ill.

[21] Appl. No.: 771,232

[22] Filed: Oct. 4, 1991

[51] Int. Cl.$^5$ .............................................. A01B 35/28
[52] U.S. Cl. .................................... 172/245; 172/551; 172/688; 172/540
[58] Field of Search ................ 172/245, 250, 254, 540, 172/550, 551, 688, 734, 773, 776, 548, 549, 556

[56] References Cited

U.S. PATENT DOCUMENTS

| | | | |
|---|---|---|---|
| 838,477 | 12/1906 | Thrasher | 172/776 |
| 1,072,169 | 9/1913 | Sanders | 172/776 |
| 1,596,570 | 8/1926 | Altgelt et al. | 172/254 X |
| 2,839,980 | 6/1958 | Evans et al. | 172/556 X |
| 2,884,081 | 4/1959 | Weber | 172/708 X |
| 3,203,487 | 8/1965 | Whitesides | 172/548 |
| 3,452,826 | 7/1969 | Lehman | 172/551 |
| 3,608,646 | 9/1971 | Ryan | 172/500 |
| 3,618,674 | 11/1971 | Woodworth et al. | 172/584 |
| 3,734,201 | 5/1973 | Zaun | 172/551 |
| 3,967,685 | 7/1976 | Siekmeier | 172/573 |
| 4,194,575 | 3/1980 | Whalen | 172/551 |
| 4,231,433 | 11/1980 | Whitfield et al. | 172/662 |
| 4,241,793 | 12/1980 | Watkins | 172/551 |
| 4,398,608 | 8/1983 | Boetto | 172/551 |
| 4,415,041 | 11/1983 | Fackler | 172/551 |
| 4,622,906 | 11/1986 | Melgoza | 172/551 |
| 4,646,850 | 3/1987 | Brown et al. | 172/551 |

FOREIGN PATENT DOCUMENTS 1030604 5/1958 Fed. Rep. of Germany ...... 172/688

OTHER PUBLICATIONS

"Hoeing Down Weeds" Article in *Farm Industry News*, vol. 22, No. 4, Mar. 1989.

"The Yetter Rotary Hoe" Sales Brochure, Yetter Manufacturing Company.

"14 Series Rotary Hoes" Operator's Manual, John Deere, Nov. 1957.

*Primary Examiner*—Randolph A. Reese
*Assistant Examiner*—Jeffrey L. Thompson
*Attorney, Agent, or Firm*—Lee, Mann, Smith, McWilliams, Sweeney & Ohlson

[57] ABSTRACT

A rotary hoe extension and kit for extending the effective length of one set of arms of a rotary hoe to increase the separation of the axes of rotation of adjacent rows of hoe wheels to a distance greater than the diameter of the hoe wheel while maintaining lateral wheel spacing. The extension includes a body member, having an upper end or first portion including a U-shaped alignment member which surrounds the existing rotary hoe arm on three sides to provide a rigid unit and a lower end or second portion having an aperture therethrough for attachment of a hoe wheel thereto. The lower end of the arm and lower end of the extension are in alignment with each other thereby allowing for maintenance of the lateral wheel spacing. A connector arrangement is provided to secure the extension to the support arm.

19 Claims, 2 Drawing Sheets

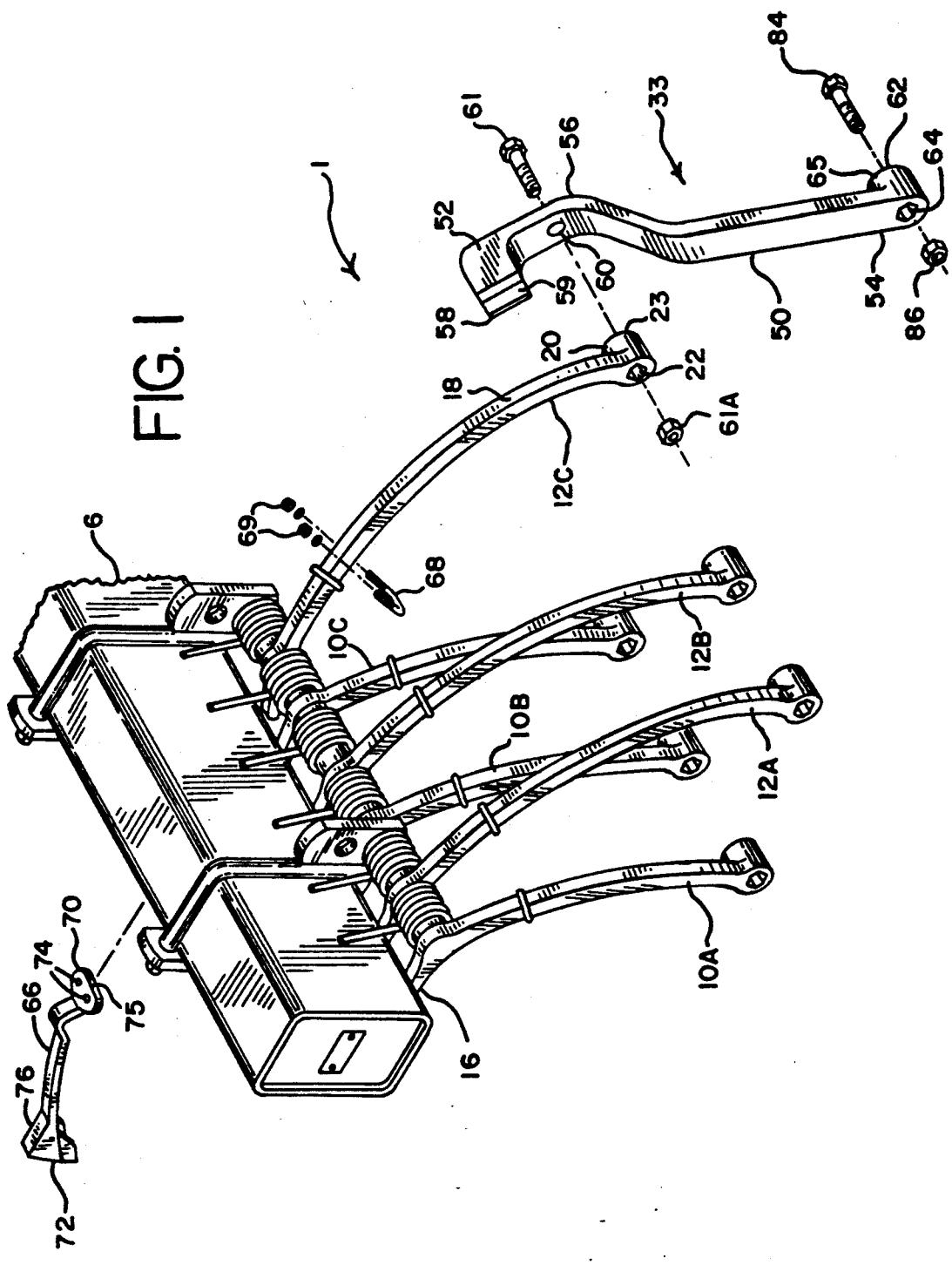

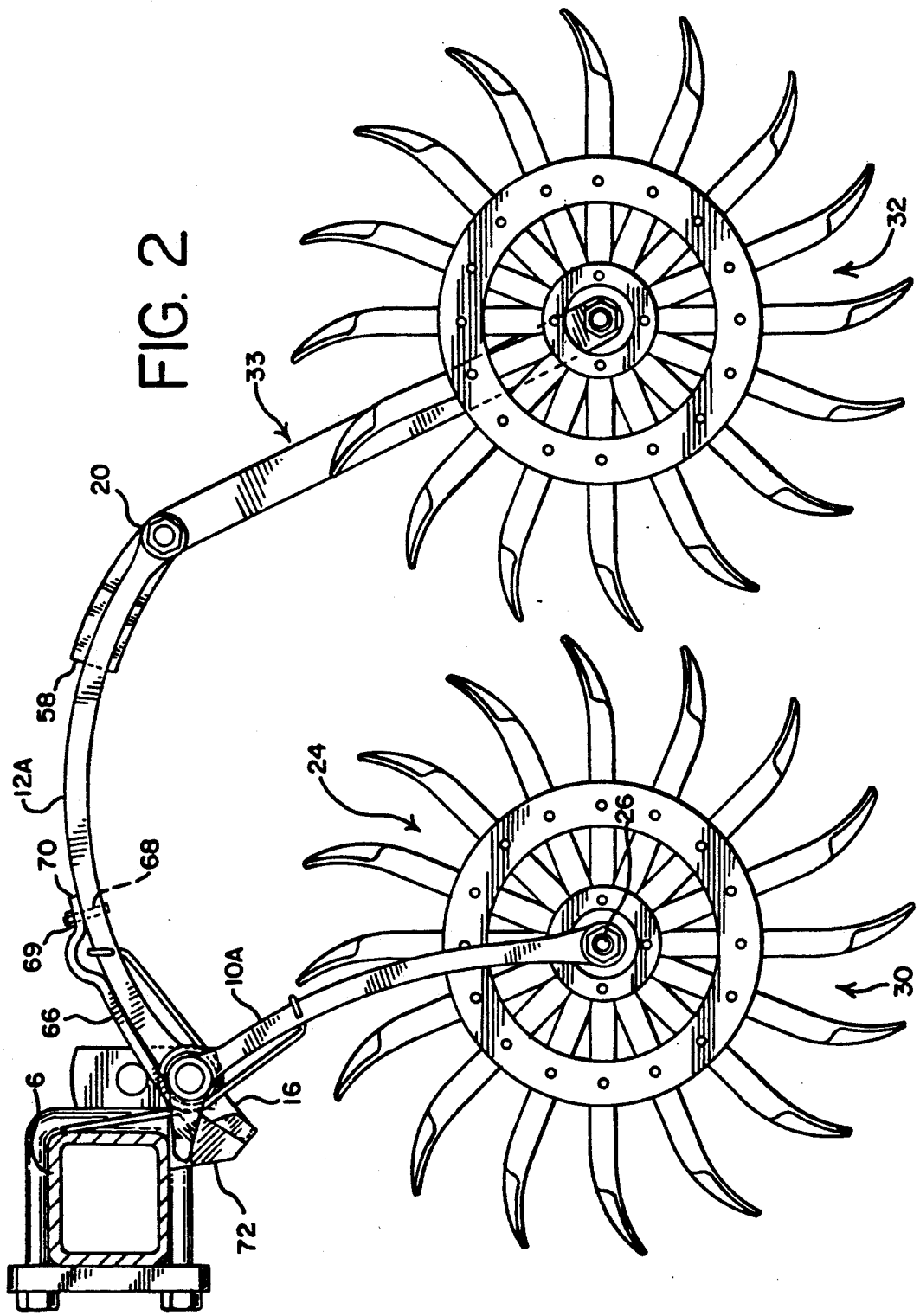

ROTARY HOE EXTENSION

BACKGROUND OF THE INVENTION

This invention relates to an extension and kit for extending the length of one set of arms of a rotary hoe. In certain farming practices, especially those using minimum or reduced tillage techniques, an abundance of field trash or crop residue is present on the surface of the field. Under such conditions, the rotary hoe wheels are apt to become entangled and wrapped by crop residue, such as corn stalks or bean stems, thus preventing the hoe wheels from rotating and thereby causing crop damage.

SUMMARY OF THE INVENTION

The rotary hoe extension and kit of the present invention allows for the conversion of a preexisting implement already in use or in inventory, without total disassembly of the implement. An extension attaches to each alternate existing rotary hoe support arm and provides a means to increase the separation of the axes of rotation of the two rows of hoe wheels to a distance greater than the diameter of the hoe wheel. With this arrangement, there is no overlap of the rotary path of adjacent hoe wheels. The extension is so shaped as to place the wheel in the same lateral position as without the extension thereby maintaining the lateral wheel spacing. This is achieved by alignment of the mounting surface of the wheel at the lower end of the extension and the mounting surface of the extension to the support arm. With this arrangement, the crop residue is not thrown up into the adjacent wheels causing the residue to entangle and wrap the wheels thereby preventing rotation.

BRIEF DESCRIPTION OF THE DRAWINGS

FIG. 1 is a perspective view in exploded format of a rotary hoe and tool bar illustrating the present invention.

FIG. 2 is a side view of the rotary hoe arrangement with the extension in place.

DETAILED DESCRIPTION OF THE PREFERRED EMBODIMENT

The drawings illustrate a rotary hoe 1 of common design which has been modified utilizing elements supplied in kit forms. As best seen in FIG. 1, the rotary hoe arrangement 1 includes a tool bar 6 adapted to be connected to a tractor. A first or front set of support arms 10 (10A, 10B, 10C) and a second or rear set of support arms 12 (12A, 12B, 12C) are shown being carried by the tool bar 6 and rotatably mounted in accordance with the arrangement shown in U.S. Pat. No. 4,194,575 owned by Yetter Manufacturing Company, the details of which are incorporated herein by reference. Each support arm includes an upper end 16 and a lower end 18. The lower end 18 includes a boss 20 and an aperture 22 extending therethrough. The boss 20 defines a face 23. As seen in FIG. 2, a rotary hoe wheel 24 is rotatably attached to the lower end 18 of the support arm 10A by a bolt 26, which extends through aperture 22, and a nut (not shown). The staggering of the support arms 10 and 12 defines a front row 30 and a rear row 32 of hoe wheels. In arrangements shown in the prior art, for example Fackler U.S. Pat. No. 4,415,041 and Yetter U.S. Pat. No. 4,194,575, there is an overlap of the rotary paths of adjacent hoe wheels. To prevent the plugging of the rotary hoe wheels 24 during operation of the rotary hoe arrangement 1, the present invention is designed to increase the separation of the axes of rotation between the front row 30 and the rear row 32 so that overlap between adjacent hoe wheels is eliminated.

The attachment of an extension 33 to each of the existing rear support arms 12 provides for an increase in the separation of the axes of rotation between the front row 30 and the rear row 32. The extension 33 includes a body member 50 having an upper end 52 and a lower end 54 and a laterally offset section 56 therebetween. The upper end 52 includes a U-shaped bracket 58 which defines a cavity 59 which wraps around an existing support arm 12 on three sides to provide unitary movement of the extension 33 and the support arm 12. An aperture 60 extends through the body member 50 to receive bolt 61 secured by nut 61A to complete the securement of the extension 33 to the arm 12 as illustrated in FIG. 1. The lower end 54 includes a boss 62 with an aperture 64 extending therethrough for rotatable attachment of a hoe wheel 24 thereto. The boss 62 defines a face 65. The body member 50 is configured such that when connected to a support arm 12, the lower end 54 of the body member 50 is aligned with the lower end 18 of the support arm 12 and the face 65 of boss 62 is aligned with the face 23 of boss 20.

The kit which is provided to modify existing rotary hoe arrangements includes, for each arm 12 to be modified, an extension 33, a stop member 66, a U-bolt 68 and a pair of nuts 69. The stop member 66 has a first end 70 and a second end 72. The first end 70 includes a pair of apertures 74 extending through a flat plate 75. The second end 72 includes an inclined abutment surface 76 which is adapted to be positioned between the upper end 16 of a support arm 12 and the tool bar 6 to limit rotation of the support arm 12. Since the effective length of each arm 12 is increased by addition of the extension 33, it will be necessary to add a stop member 66 to the upper end 16 of each arm 12 in order to maintain both rows 30 and 32 of the hoe wheels 24 at the same height for transport.

The standard rotary hoe arrangement is modified by the addition of the kit elements as follows. Each hoe wheel 24 attached to a rear arm 12 is unbolted. Apertures 22 and 60 are aligned with each other and bolt 61 is inserted and secured by nut 61A. The U-shaped bracket 58 is positioned such that the bracket 58 surrounds the support arm 12 on three sides. The bolt 61 is secured by a nut. The hoe wheel 24 previously removed from arm 12 is rotatably attached to the lower end 54 of the body member 50 by a bolt 84 which extends through the aperture 64 and the axis of the hoe wheel 24 and is secured by a nut 86. The stop member 66 is connected to the arm 12 with the second end 72 disposed between the upper end 16 of support arm 12 and the tool bar 6. The first end 70 of the stop member 66 extends down the support arm 12 and is secured thereto by the U-bolt 68 and the pair of nuts 69.

As seen in FIG. 2, the attachment of the extension 33 to the existing rear set of support arms 12 provides for an increase in the separation of the axes of rotation of the front and rear rows 30 and 32, to a distance greater than the diameter of a hoe wheel 24 thereby assuring no overlap of the rotary path of adjacent hoe wheels 24. This results in less entanglement of hoe wheels 24 by field trash, thus reducing crop damage.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. An extension for increasing the effective length of alternate support arms for use with a rotary hoe having a plurality of wheels attached to a tool bar, each wheel being rotatably connected to a support arm which provides an axis of rotation, said extension comprising a linearly extending body member; connector means for connection of said extension to alternate support arms for movement therewith; alignment means integrally formed at one end of said body member including a U-shaped bracket adapted to surround the support arm on three sides to align said body member with the support arm; and axle means at the other end of said body member for rotatably supporting a rotary hoe wheel, whereby, upon connection of said extension to the alternate support arm, the effective length of the support arm is increased a sufficient distance such that the axes of mounting of adjacent hoe wheels are offset in the direction of hoe travel an amount greater than the diameter of the hoe wheels thereby assuring no overlap of the rotary path of adjacent hoe wheels.

2. An extension as in claim 1 in which said connector means includes an aperture provided in said body member and a fastener extending through said aperture for connection to an end of a support arm.

3. An extension as in claim 1 in which said axle means includes an aperture provided at the lower end of said body member and a stem adapted to pass through the central axis of a rotary hoe wheel for insertion into said aperture, said rotary hoe wheel being thereby connected for rotation about said stem.

4. An extension as in claim 1 including a laterally offset section between the lower end of said body member and said U-shaped bracket, said body member being configured such that when connected to a support arm the lower end of said body member is aligned with the lower end of the support arm.

5. A conversion kit for extending the effective lengths of alternate support arms in a rotary hoe mechanism which includes a plurality of support arms connected to a tool bar and a rotary hoe wheel rotatably connected to one end of each support arm, the elements of the kit including an extension including a body member, having an upper end and a lower end; connector means for connecting said extension to alternate support arms for movement therewith; alignment means integrally formed at one end of said extension including a U-shaped bracket adapted to surround the support arm on three sides to align said extension with the support arm; axle means at the lower end of said extension for rotatably supporting a rotary hoe wheel; and a stop member adapted to be positioned on the upper end of the support arm to which said extension is connected to limit the rotation of same, whereby, upon connection of said conversion kit to alternate support arms the effective length of the alternate support arms is increased a sufficient distance such that the axes of mounting of adjacent hoe wheels are offset in the direction of hoe travel an amount greater than the diameter of the hoe wheels thereby assuring no overlap of the rotary path of adjacent hoe wheels.

6. A conversion kit as in claim 5 including means for attaching said stop member to a support arm.

7. A conversion kit as in claim 5 wherein said connector means includes an aperture provided in said body member and a fastener extending through said aperture for connection to an end of a support arm.

8. A conversion kit as in claim 5 wherein said axle means includes an aperture provided at the lower end of said body member and a fastener adapted to pass through the central axis of a rotary hoe wheel for insertion into said aperture, said rotary hoe wheel being thereby connected for rotation about said fastener.

9. A conversion kit as in claim 5 wherein said body member includes a laterally offset section between the lower end of said body member and said U-shaped bracket, said body member being configured such that when connected to a support arm the lower end of said body member is aligned with the lower end of the support arm.

10. A conversion kit as in claim 5 wherein said stop member includes a first end and a second end, said first end having a plurality of apertures therethrough, and said second end having an abutment surface adapted to engage said tool bar and limit rotation of a support arm.

11. A rotary hoe arrangement including a tool bar; a plurality of support arms, each support arm connected to and supported by said tool bar with a first set of support arms, each arm in said first set having an axis at a lower end thereof, each of said axes of said first set being aligned with other axes of said first set; a second set of support arms, each arm of said second set disposed between a pair of arms in said first set, each of said arms in said second set having a length greater than the length of the arms of said first set, the arms of said second set each having an axis at a lower end thereof, each of said axes of said second set being aligned with each other and spaced from the axes of said first set; and a plurality of rotary hoe wheels, each wheel rotatable about the axis of a first or second support arm, wherein the effective length of said support arms of the second set exceed the length of said support arms of the first set a sufficient distance such that the axes of mounting of adjacent hoe wheels are offset in the direction of hoe travel an amount greater than the diameter of the hoe wheels thereby assuring no overlap of the rotary path of adjacent hoe wheels.

12. A rotary hoe arrangement as in claim 11 wherein the arms of said second set of support arms each include an extension connected to said support arm thereby increasing the effective length thereof and increasing the spacing between said supported rotary hoe wheel and said tool bar.

13. A rotary hoe arrangement as in claim 11 including a stop member connected to an upper end of each arm of said second set.

14. A rotary hoe arrangement as in claim 13 including a means for connecting said stop member to said support arm.

15. A rotary hoe arrangement as in claim 11 wherein each of the arms of said second set of support arms includes an extension having a linearly extending body member; connector means for connection of said extension to said support arm for movement therewith; alignment means at one end of said body member adapted to engage said support arm and to align said body member with said support arm; and axle means at the other end of said body member for rotatably supporting said rotary hoe wheel, whereby, upon connection of said extension to the second set of support arms, the effective length of each support arm is increased and the spacing between said supported rotary hoe wheel and said tool bar is increased.

16. A rotary hoe arrangement as in claim 15 wherein said alignment means includes a U-shaped bracket adapted to surround said support arm on three sides to provide unitary movement of said extension and support arm.

17. A rotary hoe arrangement as in claim 16 wherein said extension includes a laterally offset section between the lower end of said body member and said U-shaped bracket, said body member being configured such that when connected to said support arm said lower end of said body member is aligned with said lower end of the support arm.

18. A rotary hoe arrangement as in claim 15 in which said connector means includes an aperture provided in said body member and a fastener extending through said aperture for connection to an end of said support arm.

19. A rotary hoe arrangement as in claim 15 in which said axle means includes an aperture provided at the lower end of said body member and a stem adapted to pass through the central axis of said rotary hoe wheel for insertion into said aperture, said rotary hoe wheel being thereby connected for rotation about said stem.

* * * * *